United States Patent [19]
Lillo

[11] 3,818,889
[45] June 25, 1974

[54] FOOD HEATING DEVICE FOR SNOWMOBILES

[76] Inventor: Arnold Lillo, Rt. 1 Box 186A, Good Thunder, Minn. 56037

[22] Filed: June 21, 1973

[21] Appl. No.: 372,285

[52] U.S. Cl. .................................... 126/19.5
[51] Int. Cl. .................................... F24c 9/00
[58] Field of Search............ 126/19.5; 237/12.3 A

[56] References Cited
UNITED STATES PATENTS
| | | | |
|---|---|---|---|
| 1,420,562 | 6/1922 | McBrien | 126/19.5 |
| 1,471,198 | 10/1923 | Parker | 126/19.5 |
| 1,757,448 | 5/1930 | Couper | 126/19.5 |

FOREIGN PATENTS OR APPLICATIONS
| | | | |
|---|---|---|---|
| 270,552 | 5/1927 | Great Britain | 126/19.5 |
| 279,333 | 10/1927 | Great Britain | 126/19.5 |

*Primary Examiner*—Edward G. Favors
*Attorney, Agent, or Firm*—Williamson, Bains & Moore

[57] ABSTRACT

A food heating device for snowmobiles includes a generally rectangular-shaped receptacle having a closure member for opening and closing the receptacle. The rear wall of the receptacle has a plurality of pairs of slots therein, and an elongate flexible metallic strap which extends through a selected pair of slots and is applied to a snowmobile muffler. Suitable strap tightening means are provided for tightening the strap on the snowmobile muffler so that the rear wall of the receptacle is urged tightly against the wall of the muffler. The receptacle is quickly heated during operation of the snowmobile to heat and/or cook food within the receptacle.

4 Claims, 4 Drawing Figures

PATENTED JUN 25 1974　　3,818,889

FOOD HEATING DEVICE FOR SNOWMOBILES

SUMMARY OF THE INVENTION

This invention relates to a food heating device for snowmobiles.

It is a general object of this invention to provide a food heating device of simple inexpensive construction which is adapted to be mounted on the muffler of a snowmobile for heating food contained therein, during operation of the snowmobile.

The food heating device includes a receptacle which is dimensioned to hold a food item or items to be cooked, such as a hamburger pattie, and may have a width dimension approximating the transverse dimension of a snowmobile muffler so that a highly effective heat exchange action takes place between the receptacle and the snowmobile muffler during operation of the snowmobile.

A more specific object of this invention is to provide a food heating device in which the receptacle is provided with a plurality of pairs of slots in the rear wall of the receptacle to accommodate a flexible mounting band and thereby permit upright mounting of the receptacle on a snowmobile muffler regardless of whether the muffler is disposed in a horizontal or vertical position. The present food heating device is especially adapted to permit recreational users of snowmobiles to effectively heat and/or cook food during the operation of the snowmobile and thus obviates the necessity of building campfires for heating food. These and other objects and advantages of this invention will more fully appear from the following description made in connection with the accompanying drawings wherein like reference characters refer to the same or similar parts throughout the several views.

DESCRIPTION OF THE PREFERRED EMBODIMENT OF THE INVENTION

Figure 1:
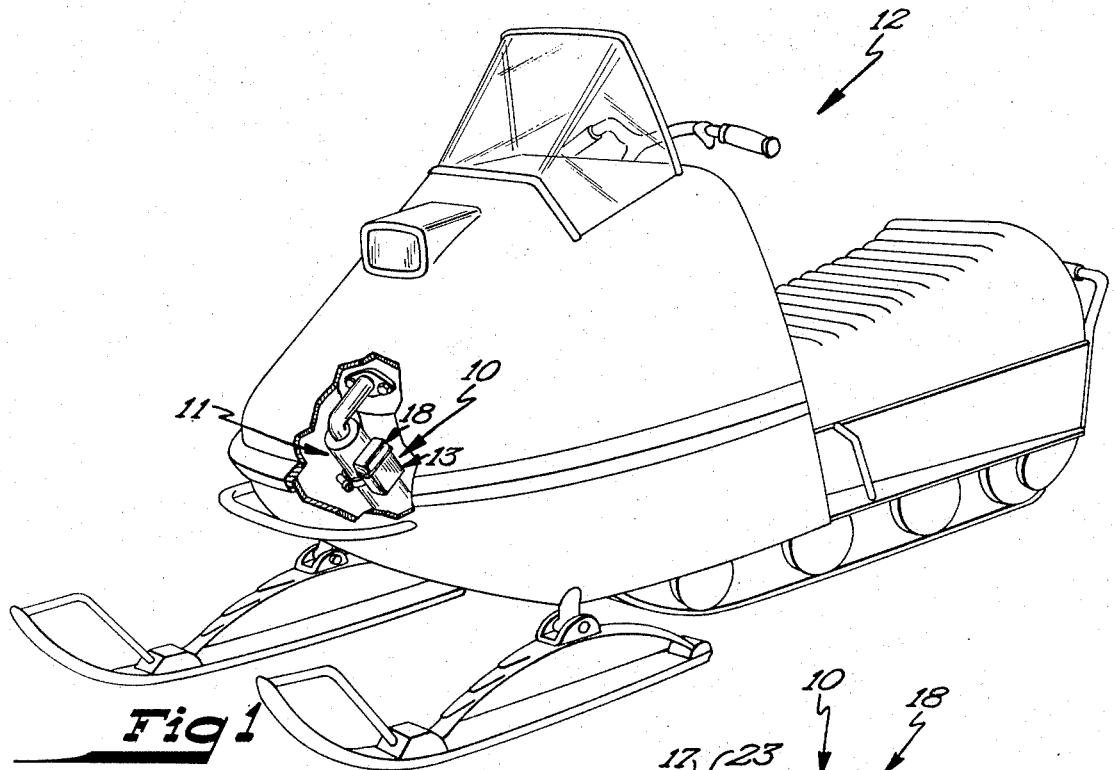
FIG. 1 is a perspective view of a snowmobile, illustrating the novel food heating device mounted on the muffler thereof.

Referring now to the drawings and more specifically to FIG. 1, it will be seen that one embodiment of the novel food heating device, designated generally by the reference numeral 10, is illustrated in mounted relation on a muffler 11 of a conventional snowmobile vehicle 12. The food heating device 10 includes a generally rectangular shaped receptacle 13 comprised of a generally rectangular shaped front wall 14, rear wall 15, bottom wall 16 and opposed side walls 17. The receptacle is preferably formed of a suitable metal such as sheet steel or the like, and has an open top which is closed by a generally rectangular-shaped closure member 18.

The closure member 18 is also formed of a suitable metallic material and is provided with a continuous downturned flange 19 which includes opposed transverse portions 20 and opposed end portions 21. It will be noted that the transverse portions 20 are positioned exteriorly of and in engaging relation with the upper portions of the front and rear walls of the receptacle while the end portions 21 are positioned exteriorly of and in engaging relation with the side walls 17 of the receptacle.

Means are provided for releasably locking the closure member 18 on the receptacle and this means includes a pair of detents 22, each dent located on one of the end portions 21 of the flange 19. Each detent projects inwardly and is engagable with a detent receiving recess 23 on the upper portion of one of the side walls 17. With this arrangement, the cover will be retained in place by the snap coupling effect of the detent 22 and detent receiving recess 23 on the side walls.

Figure 3:
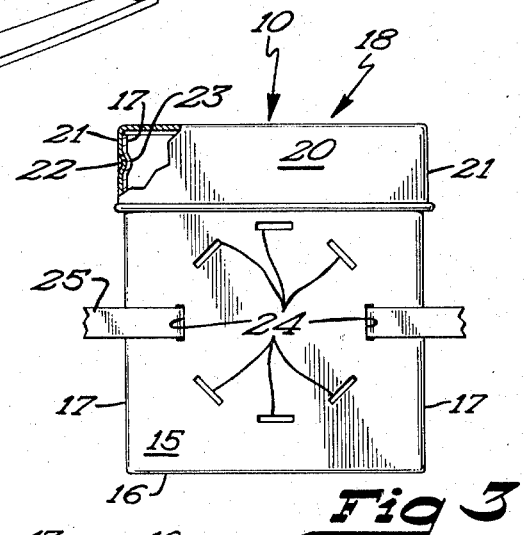
FIG. 3 is a rear elevational view of the heating device illustrating details of construction thereof.

Referring now to FIG. 3, it will be seen that the rear wall 15 is provided with a plurality of pairs of slots 24 therein which accommodate a mounting strap 25. The mounting strap 25 is formed of a suitable metallic material and is flexible and extends through a selected pair of slots 24 in the rear wall. In this respect, it will be noted that these slots comprising each pair are disposed in parallel relation and one such pair is disposed in parallel relation with respect to the side walls 17 and the flexible mounting strip 25 is illustrated as extending through this pair of slots. Another of the pair of slots are disposed substantially normal to the side wall 17 while the remaining two pair of slots 24 are disposed in transverse relation with respect to the side walls 17. With this particular arrangement, the mounting strap 25 may be looped through a selected pair of slots and then applied to a snowmobile muffler to orient the receptacle in an upright position regardless of the position of the snowmobile muffler. In this respect, it will be appreciated that in some instances, the snowmobile muffler will extend in an upright relation, while in others the muffler will extend in an angular relation or even in a horizontal position. Thus the functional advantage of the plurality of pairs of slots permits proper mounting of the receptacle in an upright relation to assure the item of food within the receptacle will not be inadvertently displaced therefrom.

Figures 2, 4:
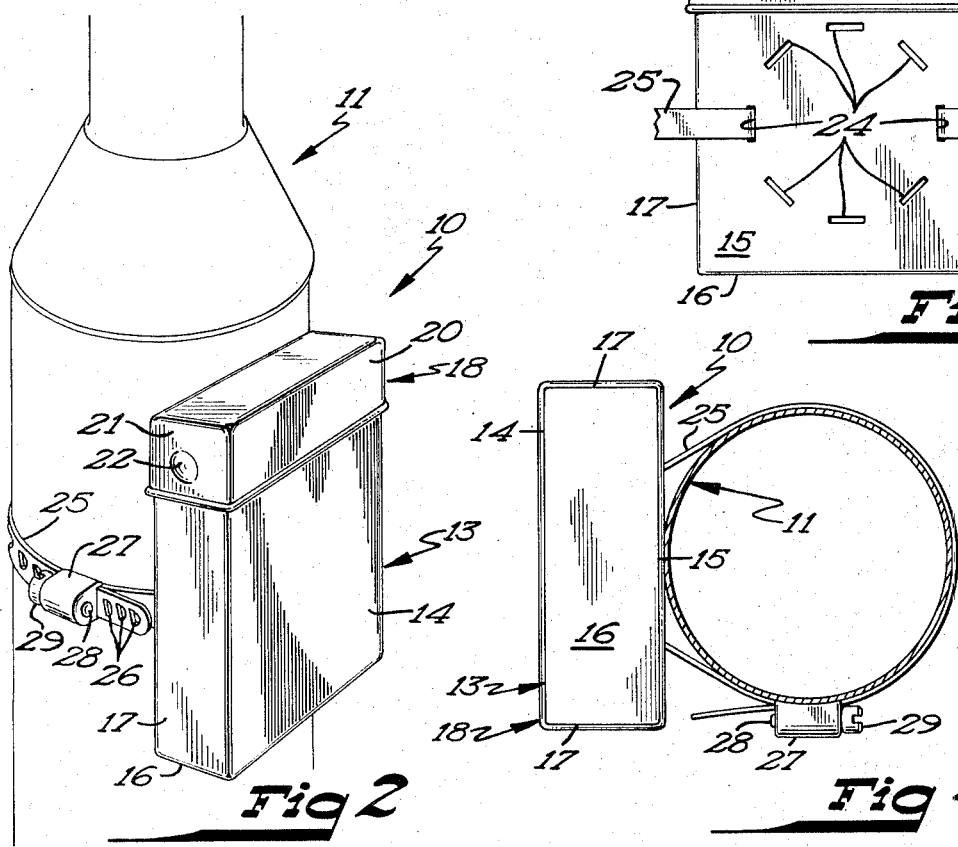
FIG. 2 is a perspective view on an enlarged scale of a portion of a snowmobile muffler, illustrating the novel heating device mounted thereon.
FIG. 4 is a cross-sectional view taken approximately along line 4—4 of FIg. 2 and looking in the direction of the arrows.

The mounting strap 25 is adapted to extend around and engage a snowmobile muffler 11 and to be connected thereto as best seen in FIG. 2. Therefore, one end portion of the strap 25 is provided with a plurality of longitudinally spaced apart transversely extending slots 26 therein, while the other end portion of the strap is provided with a housing 27. An elongate threaded slot engaging member or bolt 28 is journaled in the housing 27 and extends longitudinally of the strap 25. The threads of the slot engaging bolt 23 engage in the slots 26 of the strap so that when the bolt 28 is rotated in one direction, the bolt will progressively tighten the strap against the exterior surface of the snowmobile muffler 11. The bolt 28 is provided with a slotted head 29 to facilitate rotation of the bolt relative to the housing 27. It will also be appreciated that by rotating the bolt in the opposite direction, the strap may be loosened and disengaged from embracing relation with respect to the snowmobile muffler.

In use, the receptacle will be strapped to the snowmobile muffler and a food item can be cooked, such as a hamburger pattie will be placed in the receptacle. It will be appreciated that it is often necessary to wrap an item to be cooked in a suitable foil or other heat transmittable material before placing the item in the receptacle. The closure member 18 is then applied to the receptacle to close the same and when the snowmobile is operating, the heat generated by the combusted gases will heat the muffler which in turn will effectively heat the receptacle 13. Therefore, the food item to be heated or cooked contained within the receptacle will be very effectively heated or cooked during operation of the snowmobile.

The receptacle 13 is preferably sized so that its width dimension corresponds to the diameter of the muffler to maximize the heat transfer between the receptacle and the muffler. With this arrangement, the receptacle will be quickly heated since the heat exchange action will occur between the muffler and a substantial portion of the rear wall of the receptacle. The length of time required to heat or cook any food item will be determined by the item to be cooked and it will be appreciated that various kinds of food items may be heated or cooked in the receptacle. It will therefore be seen that the food heating device is especially adapted for recreational use of snowmobiles.

From the foregoing description, it will be seen that I have provided a novel food heating device for use with snowmobiles, which, when used permits food items to be effectively heated and/or cooked. It will also be noted that the food heating device may be readily mounted on substantially any snowmobile muffler in an upright condition through the use of my novel mounting strap and its relation with the slotted rear wall of the receptacle.

Thus, it will be seen that I have provided a novel food heating device for use with snowmobiles, which is not only of simple and inexpensive construction, but one which functions in a more efficient manner than any heretofore known comparable device.

What is claimed is:

1. A food heating device for snowmobiles, comprising:
   an open top, generally rectangular shaped receptacle having front and rear walls, opposed side walls and a bottom wall,
   said rear wall having a plurality of spaced apart elongate pairs of slots therein, the slots comprising each pair of slots being disposed in parallel relation with respect to each other, one pair of slots being disposed in substantially parallel relation with the side walls of the receptacle, another pair of said slots being disposed substantially normal to the side walls of the receptacle, and another pair of said slots being disposed in transverse relation with respect to the side walls of the receptacle,
   a substantially flat closure member having a continuous downturned flange integral therewith and engaging the receptacle to close the open top thereof and being removable therefrom, cooperating releasable locking elements on said closure member and receptacle for releasably locking the closure member on said receptacle,
   an elongate mounting strap formed of a metallic material extending through a selected pair of slots in the rear wall of the receptacle, and adapted to extend around and engage a snowmobile muffler, cooperating intergaging means on opposite ends of said mounting strap to permit said strap to be tightened around the snowmobile muffler to thereby clamp the rear wall of the receptacle against the snowmobile muffler, said receptacle being dimensioned to contain a food item to be cooked, and when applied to a snowmobile muffler, cooking the food item during operation of the snowmobile.

2. The heating device as defined in claim 1 wherein said continuous flange on said closure is of generally rectangular configuration and includes opposed substantially parallel longitudinal portions and opposed substantially parallel end portions, said locking elements including a pair of detents on one of said last mentioned portions, and a pair of detent engaging recesses on said receptacle.

3. The heating device as defined in claim 2 wherein said means for tightening said strap includes a plurality of longitudinally spaced apart slots in said strap adjacent one end thereof, a slot engaging member rotatably mounted on the other end of said strap and simultaneously engaging a plurality of slots, and when rotated in one direction tightening the strap against a snowmobile muffler, and when rotated in the opposite direction loosening said strap with respect to the snowmobile muffler.

4. The heating device as defined in claim 3 wherein said rotatable slot engaging member is threaded.

* * * * *